US012808226B2

(12) United States Patent
Sandoval, Jr. et al.

(10) Patent No.: US 12,808,226 B2
(45) Date of Patent: Nov. 24, 2026

(54) ACCESS CONTROL HARDWARE WITH FIRE PROTECTION FEATURES

(71) Applicant: Schlage Lock Company LLC, Carmel, IN (US)

(72) Inventors: Jaime Sandoval, Jr., Colorado Springs, CO (US); Nathanael Taylor, Colorado Springs, CO (US); Ashwin Hanumant Bajikar, Belagavi (IN); Steven Verderaime, Colorado Springs, CO (US); Nathanael S. Murphy, Queen Creek, AZ (US); Cecil Richardson Johnson, Trichy (IN)

(73) Assignee: Schlage Lock Company LLC, Carmel, IN (US)

( * ) Notice: Subject to any disclaimer, the term of this patent is extended or adjusted under 35 U.S.C. 154(b) by 138 days.

(21) Appl. No.: 18/606,080

(22) Filed: Mar. 15, 2024

(65) Prior Publication Data

US 2025/0290346 A1 Sep. 18, 2025

(51) Int. Cl.
*E05B 9/08* (2006.01)
*E05B 9/00* (2006.01)
(Continued)

(52) U.S. Cl.
CPC ................ *E05B 9/08* (2013.01); *E05B 9/002* (2013.01); *E05B 15/008* (2013.01); *E05B 15/10* (2013.01);
(Continued)

(58) Field of Classification Search
CPC ... E05B 9/002; E05B 9/02; E05B 9/08; E05B 5/008; E05B 5/10; E05B 17/0075; E05B 63/00171
See application file for complete search history.

(56) References Cited

U.S. PATENT DOCUMENTS 4,012,929 A 3/1977 Solovieff
4,109,498 A 8/1978 Dietrich
(Continued)

FOREIGN PATENT DOCUMENTS

KR 200459876 Y1 4/2012
WO 2008105405 A1 9/2008

OTHER PUBLICATIONS

International Search Report; ISA/US; International Application No. PCT/US2025/020237; Jul. 15, 2025; 3 pages.
(Continued)

*Primary Examiner* — Christopher J Boswell
(74) *Attorney, Agent, or Firm* — Taft Stettinius & Hollister LLP

(57) ABSTRACT

Access control hardware for a door generally includes an exterior trim, an interior trim, and a plurality of lockset components housed within a cross-bore through the door. At least one of the plurality of the lockset components is a fire-rated component comprised of a fire-resistant material, such as steel or bronze. The fire rated component is configured so that at least one elongated component extending between the exterior trim and the interior trim extends through at least one fire-rated component. The fire-rated components interfaces with the at least one elongated component in order to reduce or eliminate space around the at least one elongated component through which light or flames may pass.

23 Claims, 9 Drawing Sheets

(51) Int. Cl.
*E05B 15/00* (2006.01)
*E05B 15/10* (2006.01)
*E05B 15/16* (2006.01)
*E05B 17/00* (2006.01)
*E05B 63/00* (2006.01)

(52) U.S. Cl.
CPC ...... *E05B 15/1614* (2013.01); *E05B 17/0075* (2013.01); *E05B 63/0017* (2013.01)

(56) References Cited

U.S. PATENT DOCUMENTS

| | | | | | |
|---|---|---|---|---|---|
| 4,143,897 | A | | 3/1979 | Bergen | |
| 4,272,974 | A | * | 6/1981 | Hennessy | E05B 63/0017 70/451 |
| 4,594,864 | A | * | 6/1986 | Hart | E05B 55/12 70/489 |
| 4,854,620 | A | * | 8/1989 | Dunphy | E05B 63/10 70/451 |
| 5,385,374 | A | * | 1/1995 | Fann | E05B 55/005 292/351 |
| 5,490,700 | A | * | 2/1996 | Zuckerman | E05B 17/0075 292/357 |
| 5,718,468 | A | | 2/1998 | Qureshi et al. | |
| 6,742,820 | B2 | * | 6/2004 | Shen | E05B 55/005 292/357 |
| 6,886,871 | B1 | | 5/2005 | Shen | |
| 7,070,210 | B2 | | 7/2006 | Lin | |
| 7,287,784 | B2 | | 10/2007 | Lin | |
| 7,488,012 | B2 | | 2/2009 | Eller et al. | |
| 7,828,347 | B2 | * | 11/2010 | Eller | E05B 63/08 292/357 |
| 7,934,754 | B2 | * | 5/2011 | Mathachan | E05B 13/002 292/336.5 |
| 8,047,586 | B2 | * | 11/2011 | Pilotelli | E05B 3/06 292/357 |
| 8,523,248 | B2 | | 9/2013 | Tien | |
| 9,290,964 | B2 | | 3/2016 | Trent et al. | |
| 9,290,965 | B2 | | 3/2016 | Hickman | |
| 11,035,149 | B2 | | 6/2021 | Barker et al. | |
| 11,131,118 | B2 | * | 9/2021 | Cohen | E05B 3/06 |
| 11,377,872 | B2 | | 7/2022 | Barker et al. | |
| 11,920,388 | B2 | * | 3/2024 | Murphy | E05B 55/005 |
| 2009/0160200 | A1 | | 6/2009 | Greenway et al. | |
| 2023/0013806 | A1 | * | 1/2023 | Liang | E05B 17/0075 |

OTHER PUBLICATIONS

Written Opinion of the International Searching Authority; ISA/US; International Application No. PCT/US2025/020237; Jul. 15, 2025; 8 pages.

* cited by examiner

ACCESS CONTROL HARDWARE WITH FIRE PROTECTION FEATURES

TECHNICAL FIELD

The present disclosure generally relates to access control hardware for doors, and more particularly but not exclusively relates to access control hardware with fire protection features.

BACKGROUND

Access control hardware may include locksets with trim components made from zinc, aluminum, or other material that could melt away in a fire and allow passage of fire through the opening in the door formed to receive the access control hardware. For example, if the exterior trim fails during a fire, then the interior trim may fall off the door. As a result, locksets can be provided with steel plates to attempt to block flame passage through the bore in the door that receives the lockset. However, these plates are provided with clearances to allow passage of various trim components therethrough such as fasteners, and thus do not provide full coverage of the door opening. For these reasons among others, there remains a need for further improvements in this technological field.

SUMMARY

An exemplary access control hardware for a door generally includes an exterior trim, an interior trim, and a plurality of lockset components housed within a cross-bore through the door. At least one of the plurality of the lockset components is a fire-rated component comprised of a fire-resistant material, such as steel or bronze. The fire rated component is configured so that at least one elongated component extending between the exterior trim and the interior trim extends through at least one fire-rated component. The fire-rated component interfaces with the at least one elongated component in order to reduce or eliminate space around the at least one elongated component through which light or flames may pass.

In an embodiment, the at least one fire-rated component is a fire cup and/or a latch that includes at least one passage through which at least one elongated component that is a threaded fastener passes. At least one retention flange of the at least one fire-rated component extends at least partially around the passage and captures threading of the at least one threaded fastener extending through the at least one passage to block space around the threaded fastener through which light or flames may pass during a fire.

In an embodiment, the at least one fire-rated component is a blocker that includes a receiving passage through which an elongated lockset component extends. The blocker includes flexible tabs on opposite sides of the at least one passage that engage the elongated component so the blocker remains engaged to the elongated component and blocks space around elongated component through which light or flames may pass during a fire.

Using any one or combination of the fire-rated components in the lockset components located in the cross-bore of the door reduces or prevents light and flame passage through the cross-bore of the door. In addition, even if the exterior trim melts away such that the at least one elongated component is no longer engaged thereto, the at least one elongated component is still held in place by the at least one fire rated component to maintain blockage of the cross-bore and prevent passage of light and/or flame through the cross-bore in the door. Further embodiments, forms, features, and aspects of the present application shall become apparent from the description and figures provided herewith.

DETAILED DESCRIPTION OF ILLUSTRATIVE EMBODIMENTS

Figure 1:
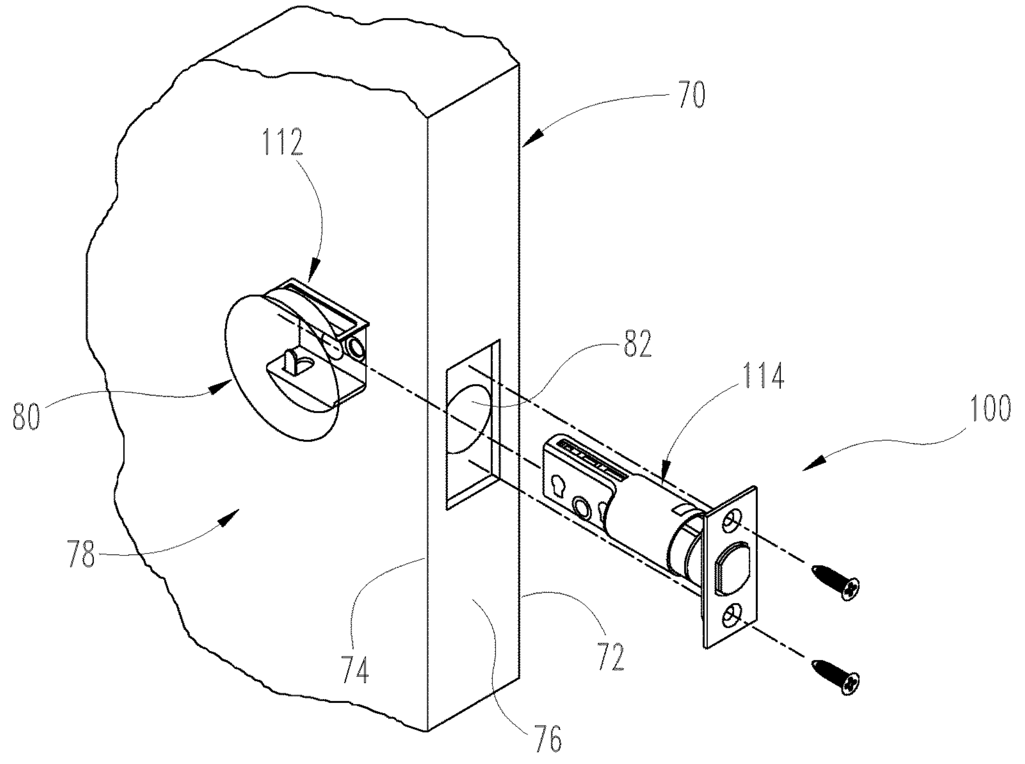
FIG. 1 is an exploded assembly view of a door and access control hardware including a lockset with a fire-rated component according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 2:
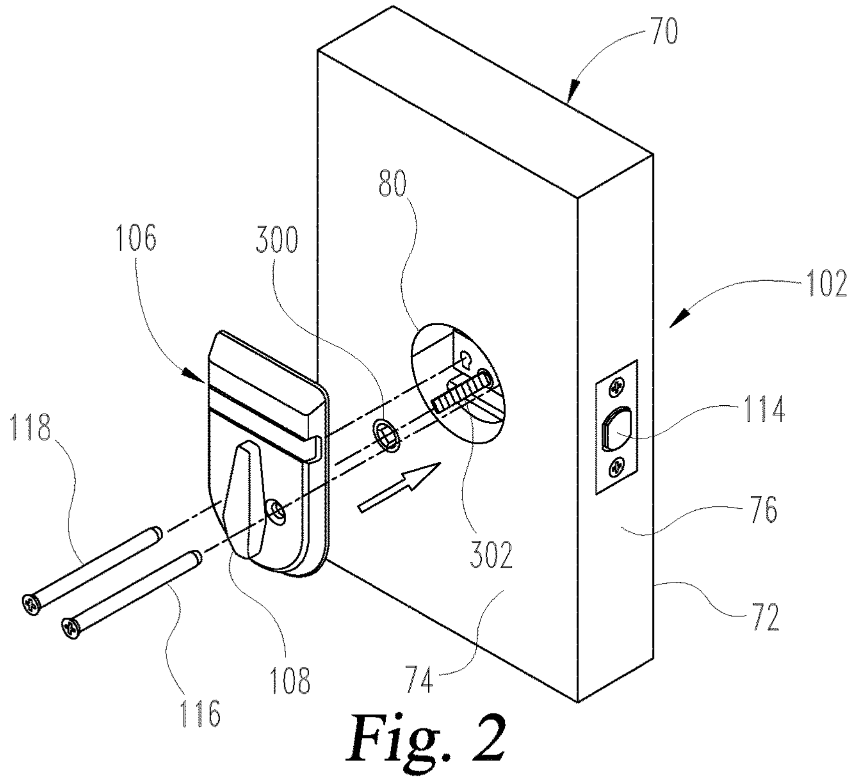
FIG. 2 is an exploded assembly view of the door and an interior trim for engagement with the lockset of FIG. 1 according to certain embodiments.

With reference to FIGS. 1-2, illustrated therein is a door 70 onto which access control hardware 100 can be installed according to certain embodiments disclosed herein. The door 70 has a non-egress or exterior side 72, an egress or interior side 74 opposite the non-egress side 72, and a latch edge 76. The door 70 is provided with a standard door preparation 78, which includes a cross-bore 80 that extends between the non-egress side 72 and the egress side 74. In certain embodiments, a latch bore 82 is provided that extends from the latch edge 76 to the cross-bore 80.

The access control hardware 100 generally includes a plurality of lockset components 102 mounted in the cross-bore 80 and/or latch bore 82, an exterior trim 104 (FIG. 7) mounted to the non-egress side 72, and an interior trim 106 mounted to the egress side 74. Each of the trims 104, 106 may include an actuator 108 such as a thumb turn, handle, lock cylinders, etc., operable to actuate one or more of the lockset components 102, such as to latch and unlatch a latch, lock and unlock a deadbolt or a lock, etc.

Lockset components 102 may also include one or more fire-rated components 110, such as a fire cup 112 and/or a latch 114, positioned in cross-bore 80. Threaded fasteners 116, 118 extend through interior trim 106, fire cup 112, latch 114, and threadingly engage exterior trim 104 to secure access control hardware 100 to door 70. As discussed further below, in some embodiments, fire cup 112 is eliminated, or is provided in addition to another fire-rated component 110, which may include any sleeve housing, plate or other fire-rated component that is part of lockset components 102 in cross-bore 80. As used herein, a fire-rated component 110 is any component of lockset components 102 that is made from a fire-resistant material, such as steel or bronze.

Referring further to FIGS. 3-17, in an embodiment, access control hardware 100 is provided for door 70. Access control hardware 100 includes exterior trim 104 for mounting on non-egress side 72 of door 70, interior trim 106 for mounting on egress side 74 of door 70, and a plurality of lockset components 102 mounted within bore 80 of door 70 extending from non-egress side 72 to egress side 74 of door 70. The plurality of lockset components 102 include at least one fire-rated component 110, 112, 114 comprised of a fire-resistant material. The at least one fire-rated component 110, 112, 114 includes at least one passage 120, 122, 220, 222 extending therethrough and at least one retention flange 150, 152, 154, 156, 250, 252, 254, 256 extending around a portion of the at least one passage 120, 122, 220, 222. The plurality of lockset components 102 also include at least one threaded fastener 116, 118 extending from interior trim 106 through the at least one passage 120, 122, 220, 222 into threaded engagement with exterior trim 104. The at least one threaded fastener 116, 118 includes threading captured by the at least one retention flange 150, 152, 154, 156 to retain the at least one fastener 116 118 in position in the event the threaded fastener 116, 118 is disengaged from the exterior or interior trim 104, 106.

In an embodiment, a fire-rated component 110, 112, 114 for access control hardware 100 is provided. Fire-rated component 110, 112, 114 includes a body 130, 230 defining a receptacle 134, 234 for housing a lockset component 102. Body 130, 230 includes a plate portion 132, 232 defining at least one passage 120, 122, 220, 222 for receiving threaded fastener 116, 118. Plate portion 132, 232 includes a first retention flange 150, 154, 250, 254 extending around a first portion of the at least one passage 120, 122, 220, 222 and a second retention flange 152, 156, 252, 256 extending around a second portion of the at least one passage 120, 122, 220, 222. First retention flange 150, 154, 250, 254 and second retention flange 152, 156, 252, 256 are circumferentially spaced from one another.

In an embodiment, a fire-rated component 110, 300 for access control hardware 100 is provide. The fire-rated component 110, 300 includes a blocking body 304 comprised of first resistant material. The blocking body 304 defines a receiving passage 306 for receiving an elongated lockset component, such as a tailpiece or drive bar 302 passing through blocking body 304. The blocking body 304 includes a first pivotable tab 308 on one side of receiving passage 306 and a second pivotable tab 310 on another side of receiving passage 306. The first and second pivotable tabs 308, 310 engage the lockset component 302 while pivoting away from one another to allow passage of the lockset component therebetween.

Figure 3:
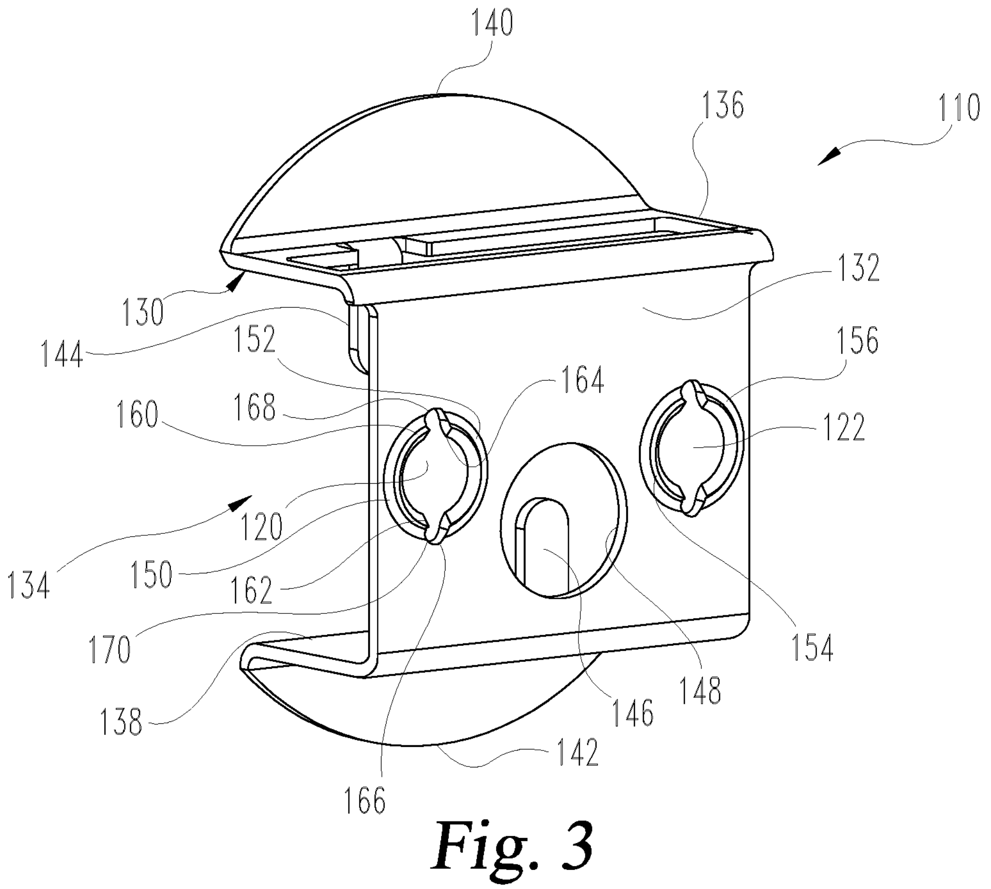
FIG. 3 is a perspective view of a fire-rated component that is a fire cup.
Figure 4:
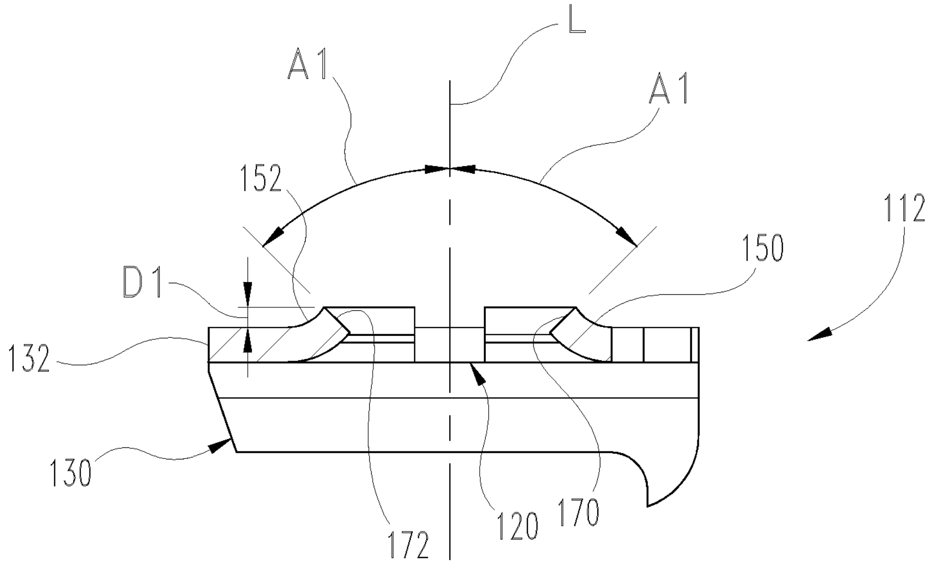
FIG. 4 is a section view showing details of retention flanges of the fire cup of the fire cup of FIG. 3.
Figure 5:
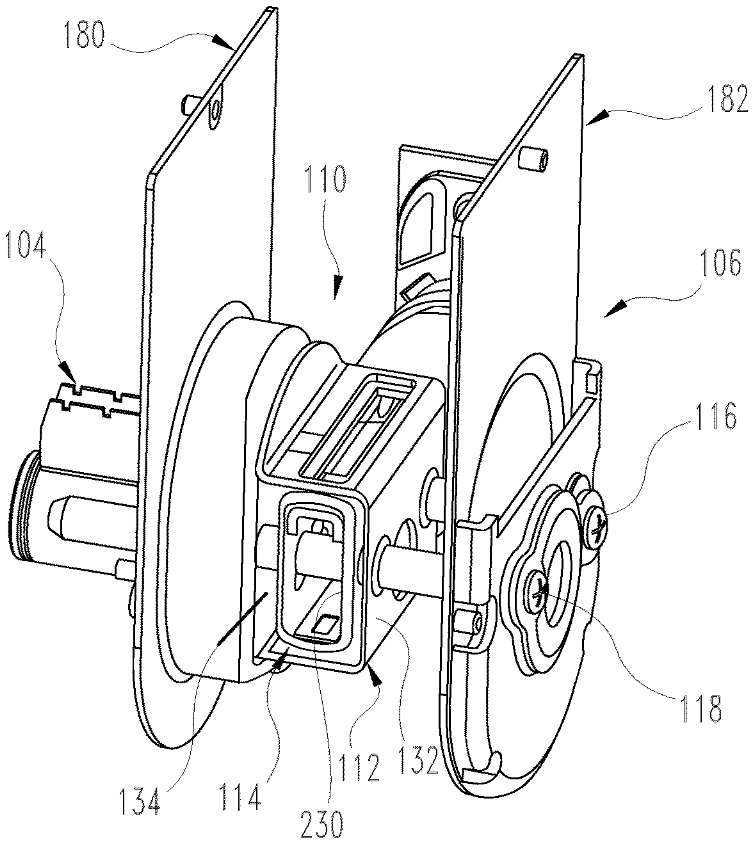
FIG. 5 is a perspective view of the assembled access control hardware including the fire cup of FIG. 3 around a latch mechanism and fasteners extending through the fire cup and the latch mechanism to secure the interior trim to the exterior trim.

Referring to FIGS. 3-4, further details of fire-rated component 110 in the form of fire cup 112 will be described. Fire cup 112 includes body 130 defining receptacle 134 that is configured to receive one or more lockset components 102. For example, in an embodiment, lockset component 102 includes body 230 of latch 114, and a portion of body 230 is positioned in receptacle 134, such as shown in FIG. 5.

Body 130 includes plate portion 132 extending along one side of receptacle 134. Body 130 also includes upper and lower legs 136, 138 extending transversely to plate portion 132 along upper and lower sides of receptacle 134. Each of the upper and lower legs 136, 138 includes corresponding one of a semi-circular abutment portion 140, 142 extending transversely thereto and parallel to plate portion 132. Each of upper and lower legs 136, 138 also includes a corresponding one of retaining tabs 144, 146 extending along receptacle 134 parallel to plate portion 132 on the opposite side of receptacle 134.

Plate portion 132 may also include a hole 148 for passage of a lockset component 102 transversely therethrough, such as a lock cylinder tailpiece. Embodiments without hole 148 are also contemplated. Plate portion also includes first passage 120 and second passage 122 for receiving respective ones of the threaded fasteners 116, 118. Plate portion 132 includes first and second retention flanges 150, 152 extending partially around first passage 120. Plate portion 132 also includes third and fourth retention flanges 154, 156 extending partially around second passage 122.

First retention flange 150 extends circumferentially around first passage 120 between opposite ends 160, 162 of first retention flange 150. Second retention flange 152 extends circumferentially around second passage 122 between opposite ends 164, 166 of second retention flange 152. Ends 160, 164 are spaced from one another and separated by a first gap 168. Ends 162, 166 are also spaced from one another and separated by a second gap 170. Since the retention flanges 150, 152 do not occupy all, or extend completely around, the entire perimeter of first passage 120, first fastener 116 can be threaded through first passage 120 without being unduly hindered by retention flanges 150, 152. However, retention flanges 150, 152 are configured to project into the thread profile of first fastener 116 to capture the first fastener 116 on fire cup 112.

As shown in FIG. 4, first passage 120 extends along a longitudinal axis L, which corresponds to a direction along which first fastener 116, extends when installed. First and second flanges 150, 152 are obliquely oriented to plate portion 132, and project outwardly from a side of plate portion 132 that is opposite receptacle 134 by a first distance D1. First and second flanges 150, 152 extend to corresponding end surfaces 170, 172 of each of the first and second flanges 150, 152. Ends surfaces 170, 174 are also obliquely oriented to longitudinal axis L1, such as angles A1, to facilitate passage of threaded fastener 116 between flanges 150, 152.

Second passage 122 and its retention flanges 154, 156 can be similarly configured to first passage 120 and retention flanges 150, 152. In an embodiment, retention flanges 150, 152, 154, 156 are formed by cutting and stamping plate portion 132. However, other fabrication techniques are also contemplated.

Figure 7:
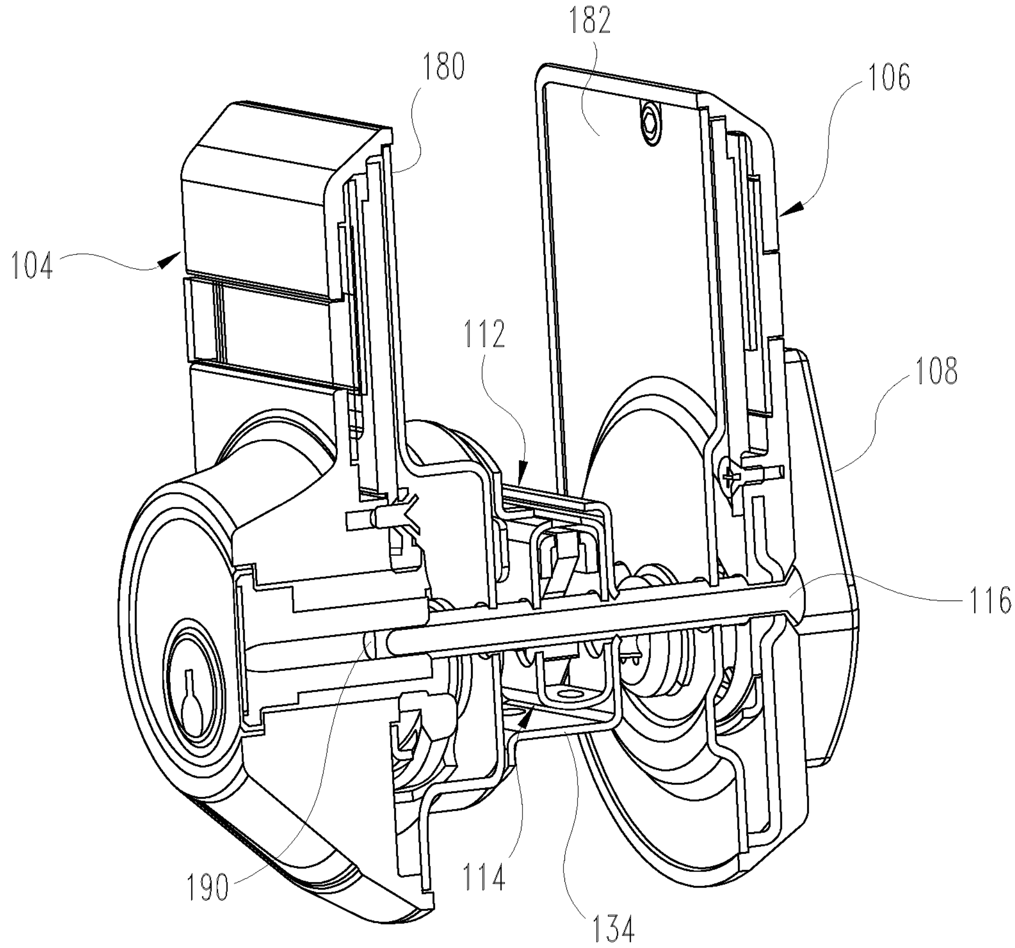
FIG. 7 is a section view of an embodiment of access control hardware with the fire cup of FIG. 3.

Referring further to FIG. 5, retaining tabs 144, 146 work in conjunction with plate portion 132 to receive and maintain the portion of lockset component 102 received in receptacle 134 in position. For example, fire cup 112 is first positioned in cross-bore 80 during assembly of access control hardware 100. Latch 114 is then installed with a portion of body 230 positioned in receptacle 134 of fire cup 112. Latch 114 is this retained in a provisional position and orientation with fire cup 112 during the initial installation steps. Threaded fasteners 116, 118 are then installed into bores of interior trim 106, through respective ones of first and second passages 120, 122 and aligned holes of lockset component 102, and into threaded blind bores 190 of exterior trim 104, such as shown in FIG. 7.

Figure 6:
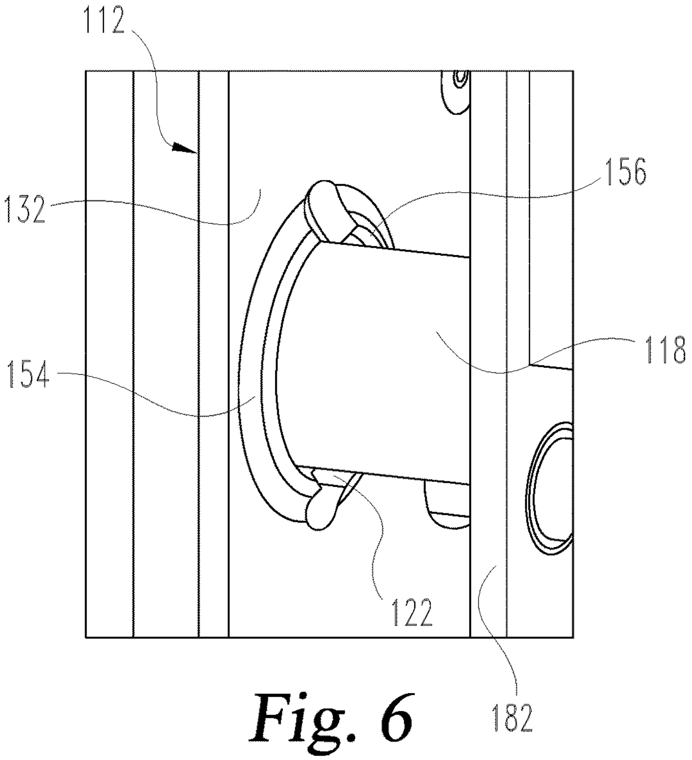
FIG. 6 is a detailed view of FIG. 5 showing an example of portions of the lockset components that remain after exposure to a fire.

In an embodiment, exterior trim 104 includes an exterior back plate 180, and interior trim 106 includes an interior back plate 182. Back plates 180, 182 are typically provided for structural support of the trim and are made from steel or other fire-resistant material. Threaded fasteners 116, 118 also pass through back plates 180, 182 in order to secure access control hardware 100 to door 70. If the non-fire rated components of exterior trim 104 melt away such that fasteners are no longer engaged in the bores 190, the fire cup 112 and/or other component with retaining flanges around the passages thereof remain engaged to threaded fasteners 116, 118 such as shown in FIG. 6. This retention of the fire-rated component 110 allows the threaded fasteners 116, 118 to maintain the positioning of exterior back plate 180 and/or interior back plate 182 during a fire.

Figure 8:
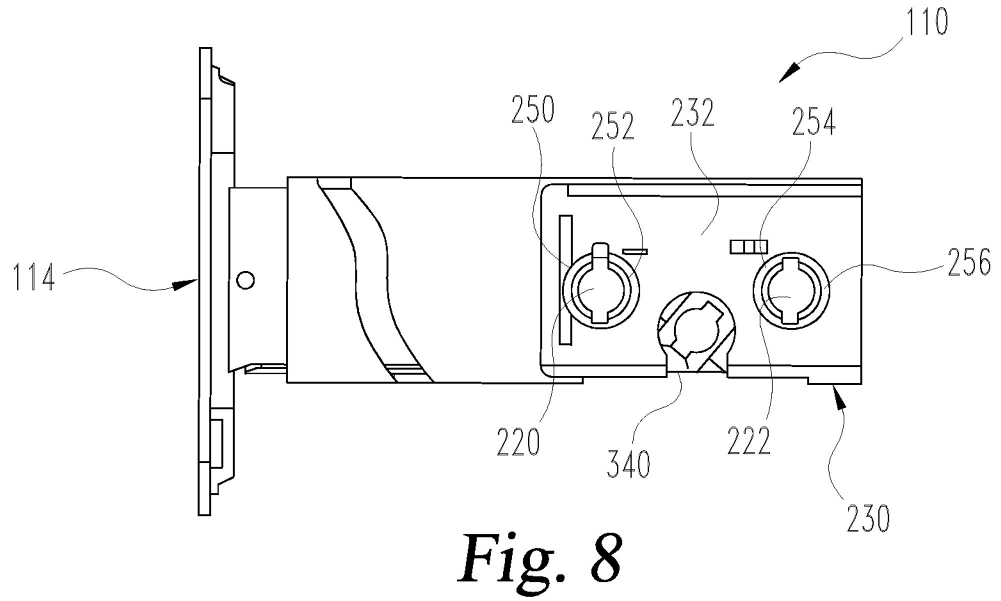
FIG. 8 is an elevation view of a fire-rated component that is a latch of the lockset including passages with retention flanges configured to capture threaded fasteners extending therethrough.
Figure 9:
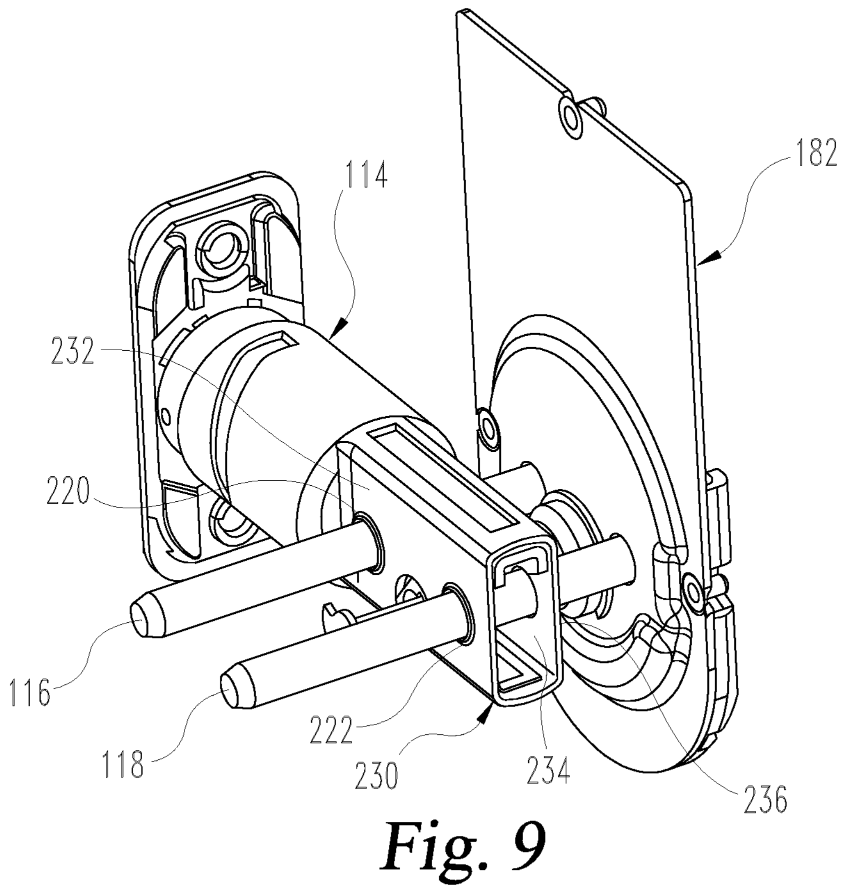
FIG. 9 is a perspective view of the latch of FIG. 8 with retention flanges of the latch of capturing threaded fasteners extending from the interior trim.

Referring to FIGS. 8-9, and example of a latch 114 that is configured as a fire-rated component is provided. Latch 114 includes a tubular or sleeve shaped body 230 defining receptacle 234 for receiving one or more lockset components 102 that are latch-related components. Body 230 includes plate portion 232 along at least one side of receptacle 234. Plate portion 232 includes first and second passages 220, 222 for receiving respective ones of the first and second threaded fasteners 116, 118. First passage 220 includes first and second retention flanges 250, 252, and second passage 222 includes third and fourth retention flanges 254, 256. Retention flanges 250, 252, 254, 256 can be configured similar to, or identically to, the flanges 150, 152 discussed above for passage 120.

In the illustrated embodiment, plate portion 232 is located on the side of body 230 facing away from interior trim 106. Additionally or alternative, the plate portion 236 of body 230 facing interior trim 106 may include retention flanges around passages for the threaded fasteners similar to plate portion 232. In a further embodiment, only one retention flange is provided around a portion of each passage through plate portion 232, and only one retention flange is provided around a portion of each passage through plate portion 236.

Figure 10:
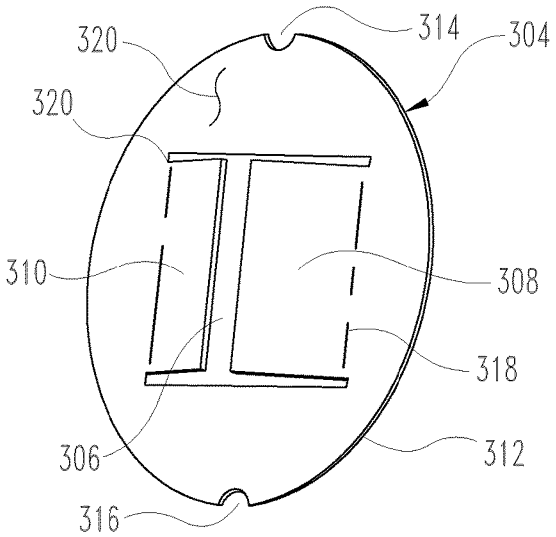
FIG. 10 is a perspective view of a fire-rated component that is a blocker.
Figure 11:
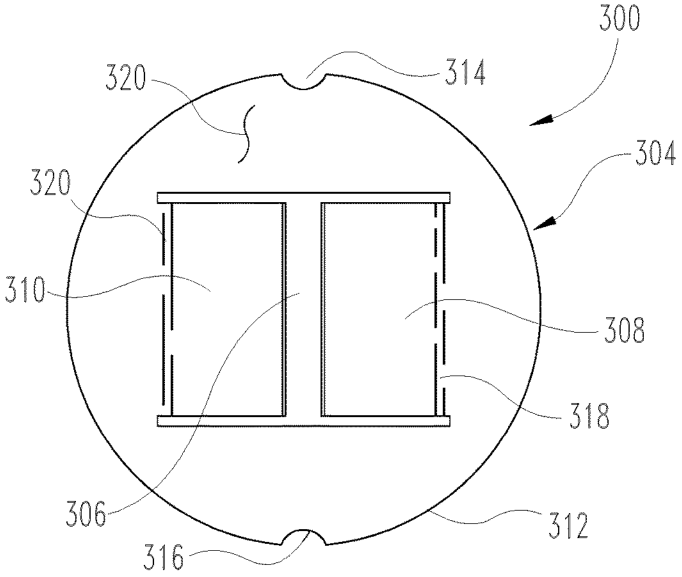
FIG. 11 is a front elevation view of the blocker of FIG. 10.
Figure 12:
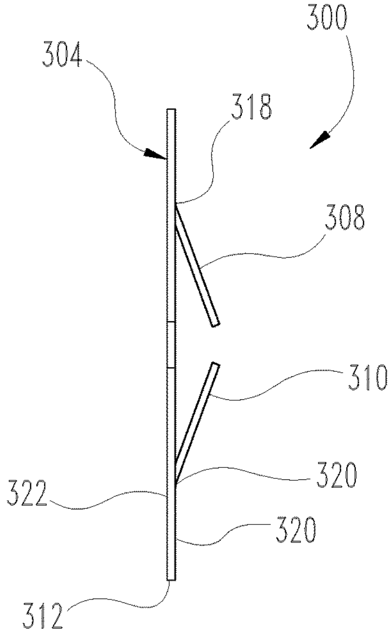
FIG. 12 is a side elevation view of the blocker of the blocker of FIG. 10.

Referring to FIGS. 10-12, another embodiment fire-rated component 110 is illustrated in the form of blocker 300. Blocker 300 can be mounted on an elongated component of lockset components 102 located in cross-bore 80, such as a tailpiece or drive bar 302 of a lock cylinder. Blocker 300 can be used alone, or in conjunction with one or more other fire rated components 110 such as fire cup 112 and/or latch 114 discussed above.

Blocker 302 includes blocking body 304 comprised of first resistant material. In an embodiment, blocker 302 is fabricated from spring steel. The blocking body 304 defines receiving passage 306 for receiving a lockset component such as drive bar 302 passing through blocking body 304. Blocking body 304 includes first pivotable tab 308 on one side of receiving passage 306 and second pivotable tab 310 on another, opposite side of receiving passage 306. The first and second pivotable tabs 308, 310 engage the driver bar 302 while pivoting away from one another to allow passage of the driver bar 302 therebetween.

In the illustrated embodiment, blocking body 304 is a flat plat-like disc with a circular shaped outer perimeter 312 extending between opposite flat side surfaces 322, 324. Perimeter 312 includes opposite notches 314, 316 to facilitate insertion, orienting, and/or retention of blocker 300. Other embodiments contemplate non-circular shapes of outer perimeter 312. First tab 308 includes a first hinged connection 318 with blocking body 304, and second tab 310 includes a second hinged connection 320 with blocking body 304. In the illustrate embodiment, first and second hinged connections 318, 320 are living hinges. Other embodiments contemplate other connections between tabs 308, 310 and plate body 304.

Figure 13:
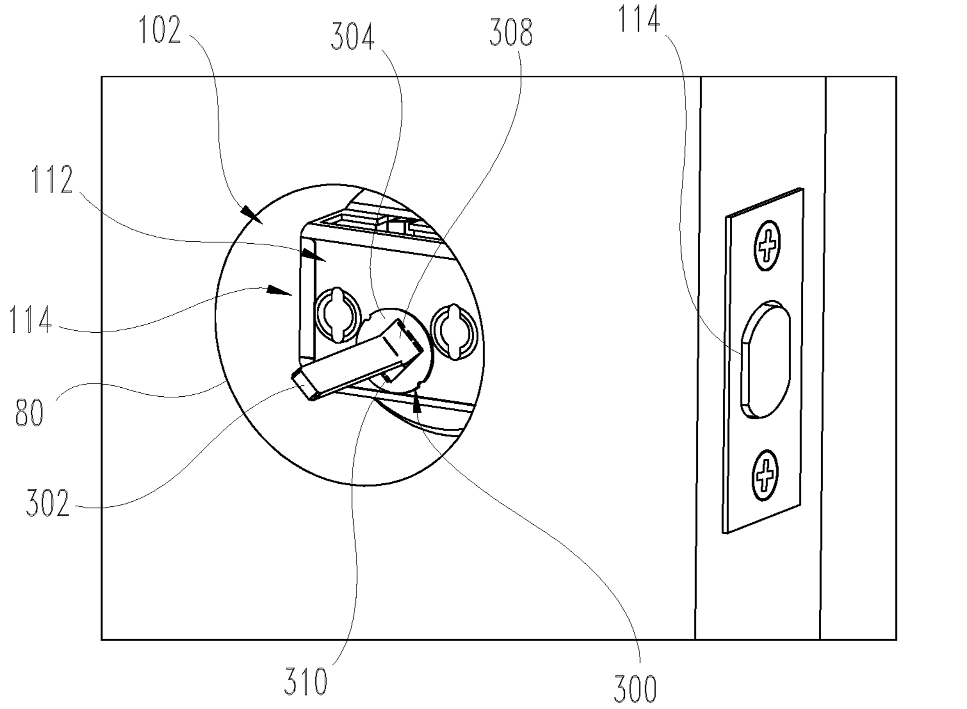
FIG. 13 is a perspective view showing the blocker of FIG. 10 mounted on an elongated lockset component of the access control hardware.
Figure 17:
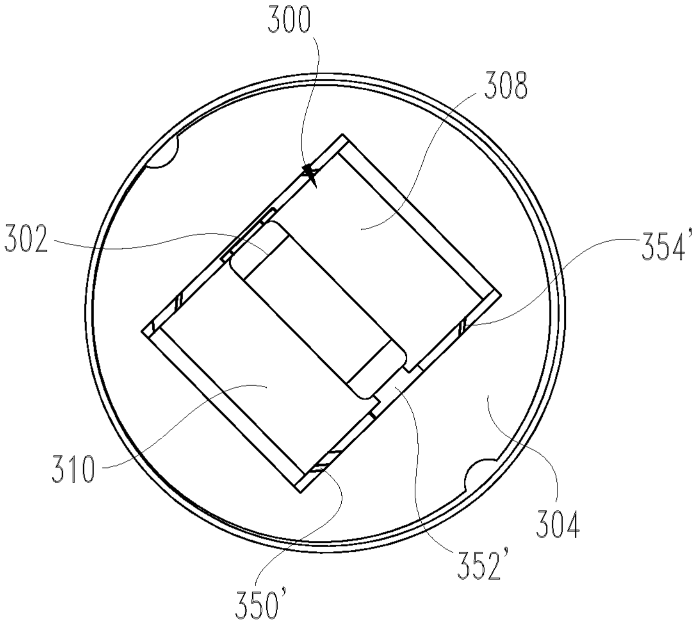
FIG. 17 is the view of FIG. 16 but with the blocker engaged to the driver bar to reduce or eliminate the openings around the driver bar.

First and second hinged connections 318, 320 orient first and second tabs 308, 310 to extend obliquely and outward from first side surface 322 as shown in FIG. 12. This allows first and second tabs 308, 310 to flex or pivot further outwardly from first side surface 322 relative to blocking body 304 to allow driver bar 302 to pass therebetween, but maintain engagement of first and second tabs 308, 310 against the opposite sides of driver bar 302, as shown in FIGS. 13 and 17. In the illustrated embodiment, first and second tabs 308, 310 are rectangularly shaped, providing linear outer edges that maximize contact drive bar 302. Other embodiments contemplate other configurations for first and second tabs 308, 310.

Figure 14:
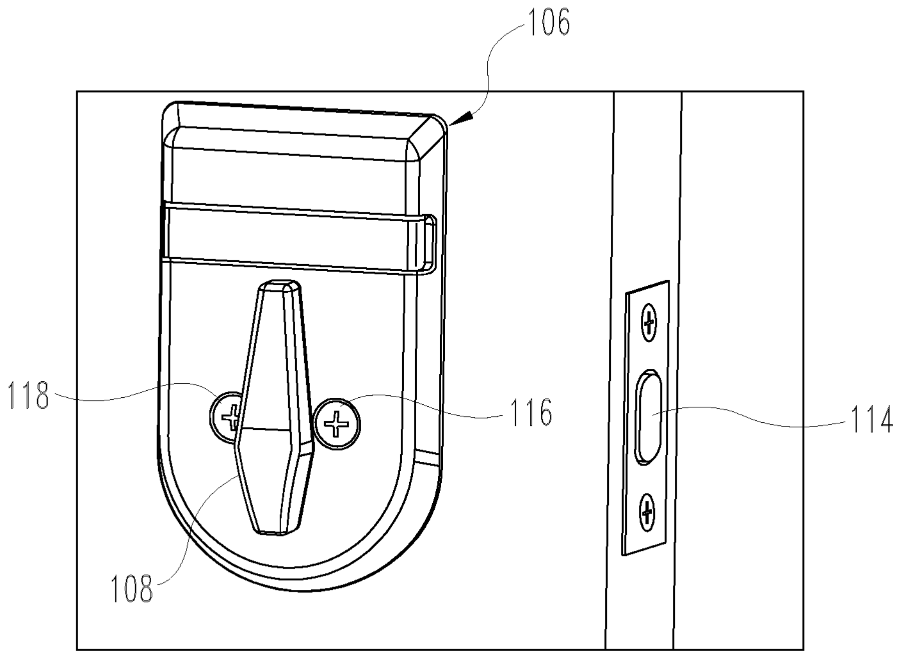
FIG. 14 is a perspective view showing interior trim mounted to the door and engaged to the lockset components.

In an embodiment, during mounting of access control hardware 100 to door 70, blocker 300 is manually positioned over drive bar 302 and slid therealong into contact with, or in adjacent position to, plate portion 132 of fire cup 112 as shown in FIG. 13. This provides a temporary hold of the exterior trim 104 on the lockset components in cross-bore 80 until fasteners 116, 118 are installed to engage interior trim 106 to exterior trim 104 through the lockset components 102 as shown in FIG. 14. Blocker 300 thus serves as an installation aid in addition to blocking passage of light and flames through cross-bore 80 along drive bore 302. In addition, the grip of blocker 300 on drive bar 302 can prevent blocker 300 from being ejected off of drive bar 302 when a hose stream is applied to lockset components 102.

Figure 15:
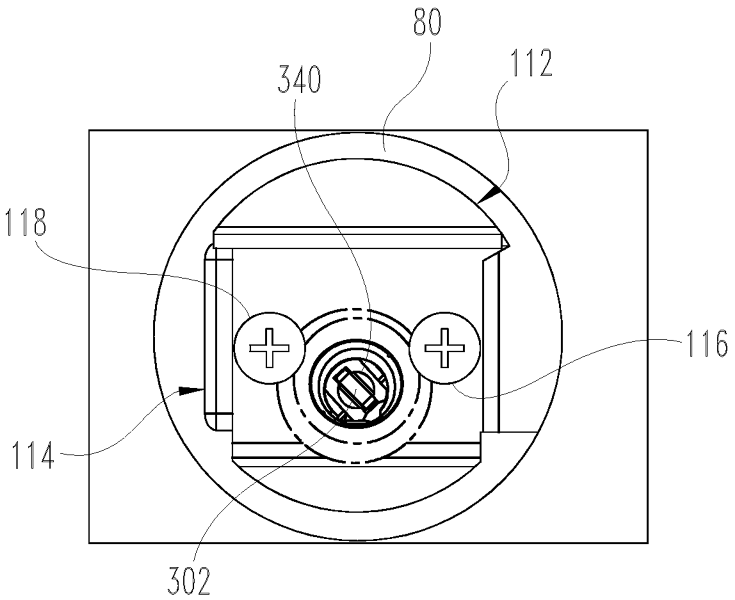
FIG. 15 is an elevation view of a portion of the lockset components on the cross-bore of the door, illustrating a driver bar without the blocker mounted to the driver bar.
Figure 16:
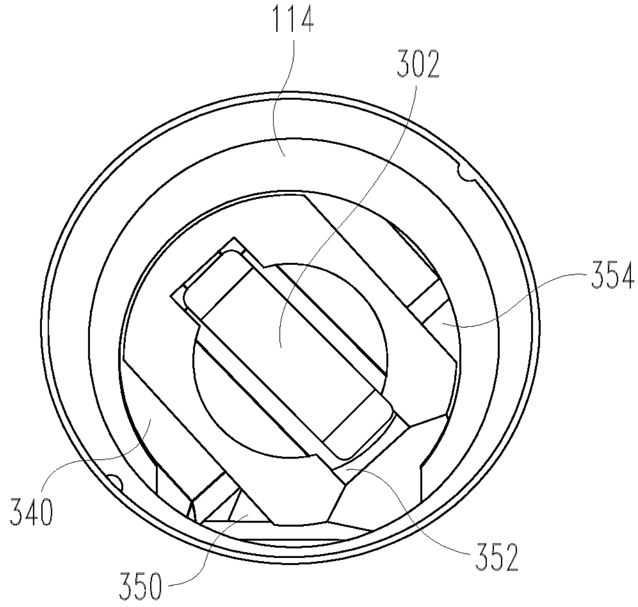
FIG. 16 is an enlarged view of a part of FIG. 15 showing openings around the driver bar between the driver bar and a latch cam.

Referring to FIGS. 15-16, lockset components 102 are shown in cross-bore 80 od door 70 without blocker 300. In particular, drive bar 302 extends through a latch cam 340 of the lockset components 102. A number of gaps 350, 352, 354 are created along drive bar 302 between latch cam 340 and drive bar 302. When blocker 300 is installed on drive bar 302, body 304 covers or blocks gaps 350, 352, 354, as shown by minimized gaps 350', 352', 354' in FIG. 17.

Various aspects of the present disclosure are contemplated. According to one aspect, access control hardware for a door includes an exterior trim for mounting on a non-egress side of the door, an interior trim for mounting on an egress side of the door, and a plurality of lockset components mounted within a bore of the door that bore extends from the non-egress side to the egress side of the door. The plurality of lockset components include at least one fire-rated component comprised of a fire-resistant material. The at least one fire-rated component includes at least one passage extending therethrough and at least one retention flange extending around a portion of the at least one passage. The plurality of lockset components also include at least one threaded fastener extending from the interior trim through the at least one passage into threaded engagement with the exterior trim. The at least one threaded fastener includes threading captured by the at least one retention flange to retain the at least one fastener in the bore of the door in the event the threaded fastener is disengaged from exterior trim.

In an embodiment, the plurality of lockset components include a latch, and the at least one fire-rated component includes a fire cup positioned around the latch.

In a further embodiment, the latch includes at least one second passage aligned with the at least one passage of the fire cup, and the at least one threaded fastener extends through the aligned passages of the fire cup and the latch.

In yet a further embodiment, the at least one second passage of the latch includes a second retention flange extending at least partially around the at least one second passage, and the threading of the at least one fastener is captured by the second retention flange.

In an embodiment, the at least one fire-rated component is a latch.

In an embodiment, the interior trim includes an interior back plate comprised of fire-resistant material, and the at least one fastener extends through the interior plate.

In a further embodiment, the exterior trim includes an exterior back plate comprised of fire-resistant material, and the at least one fastener extends through the exterior back plate.

In an embodiment, the at least one fire-rated component includes a first passage and a second passage extending therethrough. The at least one retention flange includes a first retention flange extending partially around the first passage and a second retention flange extending partially around the second passage.

In an embodiment, the at least one retention flange includes a first retention flange extending around a first side of the at least one passage and a second retention flange extending around a second side of the at least one passage. The second retention flange is spaced circumferentially from the first retention flange.

In a further embodiment, opposite circumferential ends of the first retention flange portion are spaced circumferentially from adjacent opposite circumferential ends of the second retention portion.

In a further embodiment, the fire rated component includes a planar surface facing the interior trim. The first and second retention flanges protrude outwardly from the planar surface toward the interior trim.

In yet a further embodiment, each of the first and second retention flanges extends radially inwardly to an end surface, and the end surfaces extend partially around the at least one passage.

In yet a further embodiment, the end surface of each of the first and second retention flanges is obliquely oriented to a longitudinal axis of the at least one passage.

In an embodiment, the plurality of lockset components include a blocker comprised of a fire-resistant material. The blocker includes a blocking body and a receiving passage through the blocking body. The blocking body including tabs on opposite side of the receiving passage. The plurality of lockset components also include a driver bar extending from the exterior trim through the receiving passage. The tabs engage the drive bar to retain the driver bar in bore through the door in the event the driver bar is disengaged from exterior trim.

In an embodiment, the blocking body of the blocker is a disc defining a first side and a second side opposite the first side, and the receiving passage extends between the first and second sides. The tabs include a first tab hingedly connected to the body on one side of the receiving passage and a second tab hingedly connected to the body on the other side of the receiving passage.

In a further embodiment, the first and second tabs extend obliquely to and outwardly from the first side of the blocking body.

According to another aspect of the present disclosure, a fire-rated component for access control hardware is provided. The fire-rated component includes a body defining a receptacle for housing a lockset component. The body includes a plate portion defining at least one passage for receiving a threaded fastener. The plate portion includes a first retention flange extending around a first portion of the at least one passage and a second retention flange extending around a second portion of the at least one passage. The first and second retention flanges are circumferentially spaced from one another.

In an embodiment, the at least one passage extends along a longitudinal axis, and the first and second retention flanges protrude outwardly from the plate portion in an oblique orientation to the longitudinal axis.

In a further embodiment, each of the first and second retention flanges extends from the plate portion to an end surface thereof, and each of the end surfaces is obliquely oriented to the longitudinal axis.

In an embodiment, the first and second retention flanges are configured to reside between threads of the threaded fastener.

In an embodiment, the first retention flange extends circumferentially around the at least one passage between opposite first and second circumferential ends of the first retention flange. The second retention flange extends circumferentially around the at least one passage between opposite third and fourth circumferential ends of the second retention flange. The first and third circumferential ends are positioned adjacent one another and separated by a first gap, the second and fourth circumferential ends are positioned adjacent one another and separated by a second gap, and the first and second gaps are directly opposite one another.

In an embodiment, the body forming the receptacle is a fire cup. In an embodiment, the body forming the receptacle is a housing for a latch.

According to another aspect, a fire-rated component for access control hardware is provide. The fire-rated component includes a blocking body comprised of first resistant material. The blocking body defines a receiving passage for receiving a lockset component passing through the blocking body. The blocking body includes a first pivotable tab on one side of the receiving passage and a second pivotable tab on another side of the receiving passage. The first and second pivotable tabs engage the lockset component while pivoting away from one another to allow passage of the lockset component therebetween.

In an embodiment, the blocking body is a disc defining a first side and a second side opposite the first side. The receiving passage extends between the first and second sides. The first pivotable tab and the second pivotable tab are each hingedly connected to the blocking body. The first pivotable tab and the second pivotable tab each extend obliquely to and outwardly from the first side of the blocking body.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. Access control hardware for a door, the access control hardware comprising:

- an exterior trim for mounting on a non-egress side of the door;
- an interior trim for mounting on an egress side of the door; and
- a plurality of lockset components mounted within a bore of the door, the bore extending from the non-egress side to the egress side of the door, wherein the plurality of lockset components include:
  - at least one fire-rated component comprised of a fire-resistant material, the at least one fire-rated component including at least one passage extending therethrough and at least one retention flange extending around a portion of the at least one passage such that the at least one retention flange does not extend completely around the at least one passage, wherein the at least one fire-rated component includes a body defining a receptacle for housing at least one of the plurality of lockset components, the body including:
    - a plate portion defining the at least one passage extending along a longitudinal axis;
    - an upper leg extending transversely to the plate portion along an upper side of the receptacle;
    - an upper abutment portion extending upwardly from and transversely to the upper leg;
    - an upper retaining tab extending transversely from the upper leg along a side of the receptacle that is opposite of the plate portion;
    - a lower leg extending transversely to the plate portion along a lower side of the receptacle;
    - a lower abutment portion extending downwardly from and transversely to the lower leg; and a lower retaining tab extending transversely from the lower leg along the side of the receptacle that is opposite of the plate portion; and at least one threaded fastener in the at least one passage along the longitudinal axis, the at least one threaded fastener extending from the interior trim through the at least one passage into threaded engagement with the exterior trim, the at least one threaded fastener including threading captured by the at least one retention flange to retain the at least one fastener in the bore of the door in the event the threaded fastener is disengaged from the exterior trim.

2. The access control hardware of claim 1, wherein the plurality of lockset components include a latch, and the at least one fire-rated component includes a fire cup positioned around the latch.

3. The access control hardware of claim 2, wherein the latch includes at least one second passage aligned with the at least one passage of the fire cup, and the at least one threaded fastener extends through the at least one passage of the fire cup and the at least one second passage of the latch.

4. The access control hardware of claim 3, wherein the at least one second passage of the latch includes a second retention flange extending at least partially around the at least one second passage such that the second retention flange does not extend completely around the at least one second passage, and the threading of the at least one fastener is captured by the second retention flange.

5. The access control hardware of claim 1, wherein the at least one fire-rated component is a latch.

6. The access control hardware of claim 1, wherein the interior trim includes an interior back plate comprised of fire-resistant material, and the at least one fastener extends through the interior back plate, and the exterior trim includes an exterior back plate comprised of fire-resistant material, and the at least one fastener extends through the exterior back plate.

7. The access control hardware of claim 1, wherein:

the at least one fire-rated component includes a first passage and a second passage extending therethrough; and the at least one retention flange includes:

a first retention flange extending partially around the first passage such that the first retention flange does not extend completely around the first passage; and a second retention flange extending partially around the second passage such that the second retention flange does not extend completely around the second passage.

8. The access control hardware of claim 1, wherein the at least one retention flange includes:

a first retention flange extending around a first side of the at least one passage; and a second retention flange extending around a second side of the at least one passage, the second retention flange being spaced circumferentially from the first retention flange.

9. The access control hardware of claim 8, wherein opposite circumferential ends of the first retention flange are spaced circumferentially from adjacent opposite circumferential ends of the second retention flange.

10. The access control hardware of claim 8, wherein:

the fire rated component includes a planar surface facing the interior trim; and the first and second retention flanges protrude outwardly from the planar surface toward the interior trim.

11. The access control hardware of claim 10, wherein each of the first and second retention flanges extends radially inward to an end surface, and the end surface extends partially around the at least one passage, and the end surface of each of the first and second retention flanges is obliquely oriented frelative to the longitudinal axis of the at least one passage.

12. The access control hardware of claim 1, wherein the plurality of lockset components includes:

a blocker comprised of a fire-resistant material, the blocker including a blocking body and a receiving passage through the blocking body, the blocking body including tabs on opposite side of the receiving passage; and a driver bar extending from the exterior trim through the receiving passage, the tabs engaging the drive bar to retain the driver bar in the bore of the door in the event the driver bar is disengaged from exterior trim.

13. The access control hardware of claim 12, wherein:

the blocking body is a disc defining a first side and a second side opposite the first side, and the receiving passage extends between the first and second sides; and the tabs include a first tab hingedly connected to the body on one side of the receiving passage and a second tab hingedly connected to the body on an opposite side of the receiving passage.

14. The access control hardware of claim 13, wherein the first and second tabs extend obliquely to and outwardly from the first side of the blocking body.

15. A fire-rated component for access control hardware, the fire-rated component comprising:

a body defining a receptacle for housing a lockset component, the body including a plate portion defining at least one passage extending along a longitudinal axis for receiving a threaded fastener along the longitudinal axis, the plate portion including a first retention flange extending outwardly from a side of the plate portion into the at least one passage around a first portion of the at least one passage, the plate portion including a second retention flange extending outwardly from the side of the plate portion into the at least one passage around a second portion of the at least one passage, wherein the first and second retention flanges are circumferentially spaced from one another, wherein the body includes:

an upper leg extending transversely to the plate portion along an upper side of the receptacle;

an upper abutment portion extending upwardly from and transversely to the upper leg;

an upper retaining tab extending transversely from the upper leg along a side of the receptacle that is opposite the plate portion;

a lower leg extending transversely to the plate portion along a lower side of the receptacle;

a lower abutment portion extending downwardly from and transversely to the lower leg; and a lower retaining tab extending transversely from the lower leg along the side of the receptacle that is opposite of the plate portion.

16. The fire-rated component of claim 15, wherein the first and second retention flanges protrude outwardly from the plate portion in an oblique orientation relative to the longitudinal axis.

17. The fire-rated component of claim 16, wherein:

each of the first and second retention flanges extends from the plate portion to an end surface thereof; and each of the end surfaces is obliquely oriented relative to the longitudinal axis.

18. The fire-rated component of claim 15, wherein the first and second retention flanges do not extend completely around the at least one passage and are configured to reside between threads of the threaded fastener.

19. The fire-rated component of claim 15, wherein:

the first retention flange extends circumferentially around the at least one passage between opposite first and second circumferential ends of the first retention flange;

the second retention flange extends circumferentially around the at least one passage between opposite third and fourth circumferential ends of the second retention flange; and the first and third circumferential ends are positioned adjacent one another and separated by a first gap, the second and fourth circumferential ends are positioned adjacent one another and separated by a second gap, and the first and second gaps are directly opposite one another.

20. The fire-rated component of claim 15, wherein the body forming the receptacle is a fire cup.

21. The fire-rated component of claim 15, wherein the body forming the receptacle is a housing for a latch.

22. The fire-rated component of claim 15, further comprising:

a blocking body comprised of first resistant material, the blocking body defining a receiving passage for receiving a lockset component passing through the blocking body, the blocking body including a first pivotable tab on one side of the receiving passage and a second pivotable tab on another side of the receiving passage, the first and second pivotable tabs engage the lockset component while pivoting away from one another to allow passage of the lockset component therebetween.

23. The fire-rated component of claim 22, wherein:

the blocking body is a disc defining a first side and a second side opposite the first side, and the receiving passage extends between the first and second sides;

the first pivotable tab and the second pivotable tab are each hingedly connected to the blocking body; and the first pivotable tab and the second pivotable tab each extend obliquely to and outwardly from the first side of the blocking body.

* * * * *